United States Patent
Sharma

[15] 3,652,300
[45] Mar. 28, 1972

[54] PROCESS OF TREATING FRESH FRUITS AND VEGETABLES AND COMPOSITIONS FOR USE THEREIN

[72] Inventor: Jagan N. Sharma, West Los Angeles, Calif.

[73] Assignee: Zenith Processing Corporation, Venice, Calif.

[22] Filed: Jan. 28, 1970

[21] Appl. No.: 6,546

[52] U.S. Cl. ................................99/154, 99/100 R, 99/103
[51] Int. Cl. ............................................A23b 7/14, A23l 3/34
[58] Field of Search...................99/100, 103, 154, 156, 222, 99/224, 193, DIG. 1; 252/407

[56] References Cited

UNITED STATES PATENTS

| | | | |
|---|---|---|---|
| 2,453,040 | 11/1948 | Sharma | 99/193 |
| 2,622,030 | 12/1952 | Frandsen | 99/156 |
| 2,622,032 | 12/1952 | Frandsen | 99/156 |
| 2,698,804 | 1/1955 | Crisafulli | 99/193 |
| 2,759,827 | 8/1956 | Griffin | 99/154 |

*Primary Examiner*—Norman Yudkoff
*Assistant Examiner*—Martin G. Mullen
*Attorney*—Miketta, Glenny, Poms and Smith

[57] ABSTRACT

A method of inhibiting undesirable changes in color, plasmolysis and decay of fresh fruit and vegetables (whole, sliced or shredded) by contacting the same with a liquid treating agent containing benzyl alcohol. The method employs two successive reactions, the first involving naturally occurring oxidases and the second the formation of benzoic acid. Use of solubilizing agents to facilitate the formation of aqueous solutions of benzyl alcohol, and examples of effective ranges of concentration are given.

8 Claims, No Drawings

PROCESS OF TREATING FRESH FRUITS AND VEGETABLES AND COMPOSITIONS FOR USE THEREIN

BACKGROUND OF THE INVENTION

Plasmolysis and discoloration of fresh vegetables and cut fruit and vegetables has plagued the fruit and vegetable industry for many years. The term "plasmolysis" as used herein refers to the softening, sliming and degenerated appearance and feel of plant cells, particularly leaves and the cut stems of many vegetables, which takes place quite rapidly and greatly detracts from the salability of vegetables when they arrive at the retail market. The discoloration and sliminess is very often observed on the cut stems of various leafy vegetables such as lettcce, chicory, endive and the like, in the form of a reddish discoloration which spreads to the stems of the leaves. Broccoli, cauliflower and other vegetables are prone to develop the yellowish or brownish discoloration not only on the stems, but also on the heads of these vegetables. Sliced bananas, apples and potatoes develop discoloration which persists when such slices are subsequently dehydrated or cooked and impairs the salability of such products.

Prior U.S. Pat. No. 2,215,446 was concerned with this problem as it affects leafy vegetables such as lettuce and attempted to prevent such discoloration by placing the butts or cut stems of the lettuce in contact with a porous fibrous carrier saturated with a solution of sodium thiosulfate. U.S. Pat. No. 2,453,040 utilized solutions of formaldehyde in the same manner. During recent years however, great changes have taken place in the manner in which these leafy vegetables are picked, packed and shipped and the prior materials and methods are not applicable. Lettuce for example, is not being shipped in crates or boxes, packed with crushed ice between layers of such lettuce. Instead, the customary method of harvesting lettuce and similar leafy vegetables is to have the workers cut the plant from its root stalk and leave the plant in rows on the field. Empty boxes are laid along the rows and a subsequent group of workers, each provided with a portable canister of water and a hand spray, arranges a layer of lettuce heads in a box and sprays them with water by hand, this process being repeated for the second or sometimes third layer of lettuce in a box. These boxes or cartons are subsequently taken to a so-called "packing house" which is generally reached in 3 to 6 hours from the time that the heads have been cut, this period of time being sufficient to initiate the development of the discoloration which takes place at the exposed cells of the stem. The boxes are then placed into a large vacuum chamber at the packing house and subjected to the action of vacuum which withdraws moisture rapidly and thereby reduces the temperature of the cut lettuce in the boxes to about 34° F. The now chilled lettuce in its boxes is placed into railroad cars or trucks and ice is placed in the bunkers of these vehicles or cars so as to maintain the atmosphere fairly low. However, no ice is placed on top of the boxes or is in contact with the lettuce. The prior methods are therefore incapable of being employed.

The present invention utilizes reactions with oxidases which are present in plant and fruit cells and juices, whereby the unique properties of the compounds and chemicals disclosed herein rapidly cause the formation of reaction products in situ on the surfaces of the vegetables and fruit and prevent or greatly retard the discoloration, plasmolysis and degenerative changes which impair ultimate salability of vegetables, fruit and products made therefrom. The mode of operation is particularly adapted for use during harvesting and handling procedures described above and now employed with leafy vegetables such as the various varieties of lettuce, endive and chicory, and for use in the treatment of peeled and sliced fruit and vegetables such as bananas, apples and potatoes which are eventually sold as chips or dehydrated or partly cooked or fried products. Moreover, one of the unique aspects of the present invention lies in the successive production of two reactions by the use of but a single chemical, the first reaction rendering the oxidases innocuous and the second producing a preservative which retards plasmolysis and decay.

An object of the present invention therefore is to provide a method of treating fresh fruits and vegetables in a simple manner whereby the oxidases which cause darkening and discoloration are rendered innocuous and plasmolysis and decay is greatly retarded or inhibited.

Another object is to disclose and provide a method whereby two successive reactions are caused to take place on the surface of fresh fruit and vegetables, the first reaction inhibiting darkening or discoloration and a subsequent reaction forming a minute deposit of a reaction product which enhances the keeping properties of the fruits and vegetables.

Another object is to disclose the employment of the unique properties of benzyl alcohol and liquid compositions containing benzyl alcohol, in the treatment of fresh fruits and vegetables to inhibit discoloration and retard plasmolysis and decay during shipment and storage of such fruits and vegetables.

Another object of the invention is to disclose treating compositions containing preferred contents of benzyl alcohol, adapted for use in the method of this invention.

Again, an object of the invention is to disclose and provide benzyl alcohol containing an agent adapted to facilitate the formation of aqueous compositions which contain desired concentrations of benzyl alcohol and which are stable and not subject to rapid stratification.

The methods, reactions, chemicals employed, and advantages and uses of the present invention will be apparent to those skilled in the art from the following more detailed description in which reference will be made to specific examples.

The aqueous, liquid treating composition which is brought into contact with the fresh fruit and vegetables and particularly with the cut or broken areas of the plant, fruit or vegetable in accordance with this invention, contains benzyl alcohol. Although agitation or homogenization expedites the dispersion and solution of benzyl alcohol in water so as to produce liquid compositions containing from between 0.4 percent and 4 percent by weight of benzyl alcohol, adapted for use in the method of this invention, it is often desirable to add an agent adapted to enhance the miscibility of the benzyl alcohol with water. Moreover, it is often desirable to make a base composition containing a high content of benzyl alcohol for shipment to various parts of the country, the base composition then being added to large amounts of water to produce treating compounds containing benzyl alcohol within the range stated. Various agents adapted to enhance the miscibility and solubility of benzyl alcohol in water and to improve the stability (absence of stratification upon standing) of the composition and reduce mixing time, may be employed. The addition of small quantities of sodium dioctyl sulfosuccinate (generally between about 4 percent and 10 percent by weight of benzyl alcohol) has been found very effective. A concentrated base composition may therefore contain from 50 percent to 96 percent by weight of benzyl alcohol with from 4 percent to 10 percent of the agent and from 0 percent to 46 percent of water. These solutions containing high content of benzyl alcohol may be added to predetermined amounts of water in the field, with agitation, and it will be found that the benzyl alcohol and blending agent will be readily miscible with the water forming what appears to be a clear solution which is stable. It is to be understood that the presence of other chemicals in the treating composition is not precluded.

When field crops of fresh leafy vegetables such as lettuce are being harvested in the manner previously described, the stem is cut and the cell structure exposed. The presence of naturally occurring oxidases in the cells and its juices is believed to be the cause of the undesirable discoloration which forms rapidly and which becomes pronounced within a few hours. Shortly after the plants have been severed from the soil, other workers place them in cartons, crates or boxes and, in accordance with this invention, contact the plants and particularly the cut or severed stems with the aqueous liquid composition preferably containing from about 2 percent to about 4 percent of benzyl alcohol. Usually such contact can be effectively obtained by spraying the plants while in the field box or carton, said spraying (from pressurized portable tanks provided with flexible hose and spray nozzle) also tending to flush away substantially all adhering dirt. Thereafter the field boxes are trucked to the chilling or vacuumizing chamber in the packing house, and placed into such chamber within 2½ to 6 hours after initial cutting. During this time interval (2½ – 6 hours), a reaction takes place between the benzyl alcohol and the oxidases, the ability of the latter to cause discoloration being destroyed, absorbed and rendered innocuous by the reaction. Colorless benzyl aldehyde is believed to be the reaction product which diffuses somewhat into the cells adjacent the surface of the plants (or other fruit and vegetables being treated). The reaction takes place within about 1½ to 2 hours: in the case of lettuce, an interval of between 3 to 6 hours normally occurs between the spray application of the treating composition and the introduction of the lettuce into the vacuum chamber in which the crated lettuce is chilled by the vaporization of water, thus providing adequate reaction time.

After the oxidases have been rendered innocuous as stated hereinabove, the first reaction product left on the treated vegetable is rapidly converted by exposure to air into a minute discontinuous deposit of benzoic acid on all surfaces of the treated fruit or vegetable, to produce another valuable function, namely preservation and immunization from plasmolysis and decay. This last formation of benzoic acid in situ may take place, in part at least, before lettuce is chilled by the removal of water (as previously described) or after chilling and during subsequent shipment. The formation of benzoic acid and its preservative function are obtained even when the chilling step is omitted and as soon as excess moisture evaporates.

The reactions which take place may be said to involve

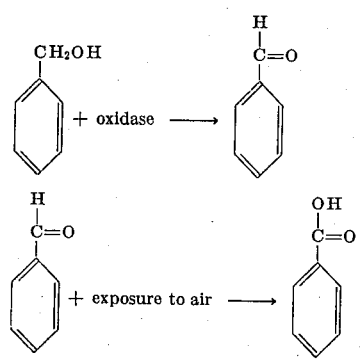

It may be noted that the solubility of the reaction product (benzyl aldehyde) is low and almost all of it is formed and remains on the surface of the treated fresh fruit, vegetable or green. The benzoic acid has a very low solubility in water and is also left on the surface. In actual practice, only about one pint of the liquid aqueous composition containing say 2 percent by weight of benzyl alcohol is used in spray treating a crate of lettuce containing about 36 heads, and even if the entire pint were to remain on the lettuce and be entirely converted to benzoic acid, the treated lettuce would carry less than 0.05 percent by weight of benzoic acid. Actually however, a proportion of such pint applied as a forceful spray is used in flushing off soil adhering to the heads and does not remain on the lettuce.

The method herein disclosed can be effectively used on broccoli, cauliflower and other vegetables which tend to turn yellow or brown, not only at the stem ends but at the leaves and flowerlets. Similarly, freshly peeled and sliced fruit and vegetables such as potatoes, apples and bananas may be treated in order to inhibit darkening or discoloration and prevent or retard decay. Oxidases are widely distributed anzymes which occur in nature and cause darkening. Freshly sliced fruits and vegetables are often dried or partially dehydrated before shipment. These food chips are used in compotes and pies, are often fried or converted into flour. The present treatment is preferably applied as soon as the fruit or vegetable has been peeled and sliced: the liquid aqueous medium containing benzyl alcohol in the lower portion of the range (say from about 0.4 percent to about 2 percent by weight) may be sprayed on such slices or the slices may quickly pass through a bath of the treating composition and excess liquid removed by the use of vibrating screens or a blast of air.

Substantially the same procedure may be used for treating and prolonging the effectively utilizable life of sliced or shredded salad greens (such as lettuce, romaine, celery, cabbage, carrots, etc.) often sold in plastic bags to institutions and retail markets. Discoloration and plasmolysis is inhibited for as long as 10 days to 2 weeks by dipping or otherwise contacting the shredded vegetables and greens to a bath containing the benzyl alcohol and then removing the excess treating solution by vibrating or rotating screens or centrifuge, before packing in bags or containers.

Those engaged in the production, packing, shipment and sale of fresh fruits and vegetables and dried fruits and vegetables will readily appreciate the advantageous results and benefits obtained by the present invention. It is economical and adapted to normal handling procedures. It permits fresh vegetables to be delivered in prime condition to distant markets, and command premium prices. A retailer need not cut off discolored stems and strip off outer leaves in an attempt to sell his produce. Dehydrated sliced fruit or sliced and frozen potatoes are light in color and withstand storage without degeneration or decay when treated in accordance with the disclosures made herein.

I claim:

1. In a method of rendering inactive naturally present oxidases in cells adjacent the surface of fresh fruits and vegetables and inhibiting undesirable color changes and plasmolysis of such fruits and vegetables, the step of spraying fresh fruit and vegetable with an aqueous medium containing from about 0.4 percent to about 4.0 percent of benzyl alcohol.

2. A method as stated in claim 1 whereby said benzyl alcohol reacts with said oxidases to form benzaldehyde and discoloration of fruit and vegetables is inhibited, and then exposing the fruit so treated to the action of air to form benzoic acid in situ on the surface of the fruit and vegetable to enhance the keeping qualities of the fruit and vegetables.

3. A method as stated in claim 1 wherein the vegetables treated are leafy vegetables, including lettuce, endive and chicory and the aqueous medium contains between about 2 percent and 4 percent of benzyl alcohol.

4. A method as stated in claim 1 wherein the fruit and vegetables treated are peeled and sliced and the aqueous medium contains between about 0.4 percent and 2 percent of benzyl alcohol.

5. In a method of inhibiting surface discoloration of cut and injured fruit and vegetables and also enhancing the keeping qualities thereof, the step of contacting the cut and injured surfaces of fresh fruit and vegetables with an aqueous medium containing from between about 0.4 percent and 4 percent of benzyl alcohol.

6. A method as stated in claim 5 wherein the aqueous medium is maintained in contact with said cuts and injuries for a time sufficient to permit reaction between the benzyl alcohol and oxidases in said cuts and injuries.

7. A method as stated in claim 6 wherein the fruits and vegetables are subsequently exposed to the action of air to form benzoic acid in situ and said cuts and vegetables.

8. A fresh plant, vegetable or fruit exhibiting at least one cut surface exposing its cell structure, such cell structure of said surface carrying a benzoic acid residue of a reaction between benzyl alcohol, naturally occurring oxidases and air.

* * * * *